US012745320B2

(12) United States Patent
Belling

(10) Patent No.: US 12,745,320 B2
(45) Date of Patent: Sep. 22, 2026

(54) METHOD AND APPARATUS FOR REDUCING PACKET LOSS DURING A MULTICAST AND BROADCAST SERVICE SESSION

(71) Applicant: Nokia Technologies Oy, Espoo (FI)

(72) Inventor: Horst Thomas Belling, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 274 days.

(21) Appl. No.: 18/623,313

(22) Filed: Apr. 1, 2024

(65) Prior Publication Data

US 2024/0341010 A1 Oct. 10, 2024

Related U.S. Application Data

(60) Provisional application No. 63/494,898, filed on Apr. 7, 2023.

(51) Int. Cl.
*H04W 76/40* (2018.01)
*H04W 76/20* (2018.01)
*H04W 76/50* (2018.01)

(52) U.S. Cl.
CPC .......... *H04W 76/40* (2018.02); *H04W 76/20* (2018.02); *H04W 76/50* (2018.02)

(58) Field of Classification Search
None
See application file for complete search history.

(56) References Cited

U.S. PATENT DOCUMENTS

2006/0063531 A1* 3/2006 Jung ........................ H04W 4/06 455/442
2023/0077191 A1* 3/2023 Xiong .................. H04W 36/26
2023/0261970 A1* 8/2023 Fujishiro .............. H04W 40/02 370/312
2023/0300938 A1* 9/2023 Latheef .................. H04W 4/06 370/329
2023/0389049 A1* 11/2023 Kim ........................ H04W 4/06

OTHER PUBLICATIONS

"3rd Generation Partnership Project; Technical Specification Group Services and System Aspects; Architectural enhancements for 5G multicast-broadcast services; Stage 2 (Release 18)", 3GPP TS 23.247, V18.0.0, Dec. 2022, pp. 1-122.

(Continued)

*Primary Examiner* — Jamaal Henson
(74) *Attorney, Agent, or Firm* — Carter, DeLuca & Farrell LLP

(57) ABSTRACT

A method, apparatus and computer program product are provided for selectively maintain a multicast and broadcast service (MBS) session as active even though packets may not be received for at least a predetermined period of time. In the context of a method, the method includes determining that an MBS session is to remain active. The method also includes providing an MBS session create request that includes a description for the MBS session. The MBS session create request further includes an indication that the MBS session is not to be deactivated in the event that incoming packets are not detected for a period of time.

20 Claims, 9 Drawing Sheets

(56) References Cited

OTHER PUBLICATIONS

"Avoiding packet loss during multicast MBS delivery due to deactivated MBS sessions", SA WG2 Meeting #156E (e-meeting), S2-230xxxx, Nokia, Apr. 17-21, 2023, 8 pages.
"LS on addressing packet loss during multicast MBS delivery", 3GPP TSG-SA WG6 Meeting #53, S6-231018, 3GPP TSG SA WG6, Feb. 27-Mar. 3, 2023, 1 page.
"[Draft] Reply LS on addressing packet loss during multicast MBS delivery", SA WG2 Meeting #156E (e-meeting), S2-230xxxx, 3GPP TSG SA WG2, Apr. 17-21, 2023, 1 pages.
"3rd Generation Partnership Project; Technical Specification Group Services and System Aspects; Procedures for the 5G System (5GS); Stage 2 (Release 18)", 3GPP TS 23.502, V18.1.1, Apr. 2023, pp. 1-829.

* cited by examiner

METHOD AND APPARATUS FOR REDUCING PACKET LOSS DURING A MULTICAST AND BROADCAST SERVICE SESSION

TECHNOLOGICAL FIELD

An example embodiment relates generally to techniques for facilitating wireless communication and, more particularly, to techniques for reducing packet loss during a multicast and broadcast service (MBS) session.

BACKGROUND

In communication systems, a MBS session may be established to concurrently transmit packets to a plurality of receiving devices, such as user equipment. The MBS session is configured to switch from an active state to an inactive state if no packets have been transmitted for a predetermined amount of time. A multicast and broadcast session management function (MB-SMF) along with a multicast and broadcast user plane function (MB-UPF) may be configured to detect that packets have not been transmitted via the MBS session for the predetermined amount of time. The MB-SMF and/or the MB-UPF may then cause the status of the multicast and broadcast session (MBS) to switch from an active status to a deactivated status. Once switched to an inactive state, the user equipment that had participated in the MBS session may transition to an idle state.

Thereafter, the MBS session may again be activated in order to transmit packets to the user equipment. As the user equipment have transitioned to an idle state, the user equipment must first be paged in order to request the user equipment to send a service request to the network to enable the user equipment to again receive packets via the MBS session.

BRIEF SUMMARY

A method, apparatus and computer program product are provided in accordance with an example embodiment in order to selectively maintain a multicast and broadcast service (MBS) session as active even if packets are not received for at least a predetermined period of time. As a result, the risk is reduced that a UE does not receive one or more packets that are transmitted at or near the time at which a deactivated session is otherwise being re-activated. Additionally, the network signaling associated with changing an MBS session between deactivated and active states may be reduced.

In an example embodiment, a method is provided that includes determining that a multicast and broadcast service (MBS) session is to remain active. The method also includes providing an MBS session create request that includes a description for the MBS session. The MBS session create request further comprises an indication that the MBS session is not to be deactivated in the event that incoming packets are not detected for a period of time. In one embodiment, the method also includes determining that a second MBS session is not to remain active, and sending, based on the determining that the second MBS session is not to remain active, a second MBS session create request that includes a description for the second MBS session. The second MBS session create request does not comprise an indication that the second MBS session is not to be deactivated in the event that incoming packets for the second MBS session are not detected for a period of time. The method of this example embodiment may also include sending, based on the determining that the second MBS session is not to remain active, a deactivation request for the second MBS session in an instance that there is no MBS data to be transmitted in the second MBS session. The method of an example embodiment further includes receiving, after the providing the MBS session create request, at least one MBS session create response.

The MBS session create request of an example embodiment further comprises an indication of an initial MBS session state. In this embodiment, the initial MBS session state can be activated or deactivated with the initial MBS session state being activated when determining that the MBS session is to remain active. In an example embodiment, the determining the MBS session is to remain active uses at least one of the following criteria for the determination: preconfigured information on whether the MBS session is to remain active, whether data of the MBS session is to be transmitted with low latency, whether data of the MBS session requires a low or no packet loss, whether the MBS session is expected to have only short periods where no data are transmitted, or whether the MBS session relates to public safety. The at least one MBS session create request may further comprise information of at least one of the following: an MBS session identifier, an MBS service type, an MBS service information, an MBS service area, an MBS session state, or MBS session start and end times. In an example embodiment, the at least one MBS session create response comprises information regarding at least one allocated ingress address.

In another example embodiment, an apparatus is provided that includes at least one processor and at least one memory storing instructions that, when executed by the at least one processor cause the apparatus at least to determine that an MBS session is to remain active. The apparatus is also caused to cause to be provided a multicast and broadcast service (MBS) session create request that includes a description for the MBS session. The MBS session create request further comprises an indication that the MBS session is not to be deactivated in the event that incoming packets are not detected for a period of time. In one embodiment, the apparatus is also caused to determine that a second MBS session is not to remain active, and to send, based on the determining that the second MBS session is not to remain active, a second MBS session create request that includes a description for the second MBS session. The second MBS session create request does not comprise an indication that the second MBS session is not to be deactivated in the event that incoming packets for the second MBS session are not detected for a period of time. The apparatus of this example embodiment may also be caused to send, based on the determining that the second MBS session is not to remain active, a deactivation request for the second MBS session in an instance that there is no MBS data to be transmitted in the second MBS session. The apparatus of an example embodiment is further caused to receive, after the MBS session create request is caused to be provided, at least one MBS session create response.

In a further example embodiment, a computer program product is provided that comprises at least one non-transitory computer readable storage medium having instructions stored therein with the instructions configured, upon execution, to determine that a multicast and broadcast service (MBS) session is to remain active. The instructions are also configured to cause to be provided an MBS session create request that includes a description for the MBS session. The MBS session create request further comprises an indication that the MBS session is not to be deactivated in the event that incoming packets are not detected for a period of time. In one embodiment, the instructions are also configured to determine that a second MBS session is not to remain active, and to send, based on the determining that the second MBS session is not to remain active, a second MBS session create request that includes a description for the second MBS session. The second MBS session create request does not comprise an indication that the second MBS session is not to be deactivated in the event that incoming packets for the second MBS session are not detected for a period of time. The instructions of this example embodiment may also be configured to send, based on the determining that the second MBS session is not to remain active, a deactivation request for the second MBS session in an instance that there is no MBS data to be transmitted in the second MBS session. The instructions of an example embodiment are further configured to receive, after the MBS session create request is caused to be provided, at least one MBS session create response.

In yet another example embodiment, an apparatus is provided that comprises means for determining that a multicast and broadcast service (MBS) session is to remain active. The apparatus also includes means for causing to be provided an MBS session create request that includes a description for the MBS session. The MBS session create request further comprises an indication that the MBS session is not to be deactivated in the event that incoming packets are not detected for a period of time. In one embodiment, the apparatus also includes means for determining that a second MBS session is not to remain active, and means for sending, based on the determining that the second MBS session is not to remain active, a second MBS session create request that includes a description for the second MBS session. The second MBS session create request does not comprise an indication that the second MBS session is not to be deactivated in the event that incoming packets for the second MBS session are not detected for a period of time. The apparatus of this example embodiment may also include means for sending, based on the determining that the second MBS session is not to remain active, a deactivation request for the second MBS session in an instance that there is no MBS data to be transmitted in the second MBS session. The apparatus of an example embodiment further includes means for receiving, after the MBS session create request is caused to be provided, at least one MBS session create response.

In the context of the apparatus, method and computer program product of the foregoing embodiments, the MBS session create request may further comprise an indication of an initial MBS session state. In this embodiment, the initial MBS session state can be activated or deactivated with the initial MBS session state being activated when determining that the MBS session is to remain active. In an example embodiment, the determining the MBS session is to remain active uses at least one of the following criteria for the determination: preconfigured information on whether the MBS session is to remain active, whether data of the MBS session is to be transmitted with low latency, whether data of the MBS session requires a low or no packet loss, whether the MBS session is expected to have only short periods where no data are transmitted, or whether the MBS session relates to public safety. The at least one MBS session create request may further comprise information of at least one of the following: an MBS session identifier, an MBS service type, an MBS service information, an MBS service area, an MBS session state, or MBS session start and end times. In an example embodiment, the at least one MBS session create response comprises information regarding at least one allocated ingress address.

In an example embodiment, a method is provided that includes receiving a multicast and broadcast service (MBS) session create request that comprises a description for an MBS session. The MBS session create request also comprises an indication that the MBS session is not to be deactivated in the event that incoming packets are not detected for a period of time. The method also includes ensuring that the MBS session remains active, based on the indication that the MBS session is not to be deactivated, in an instance that incoming packets are not detected for the period of time.

The method of an example embodiment ensures that the MBS remains active by configuring a multicast and broadcast (MB)-user plane function (UPF) to support the MBS session without reporting that incoming packets are not detected for the period of time. The method of an example embodiment ensures that the MBS remains active by receiving a report from a multicast and broadcast (MB)-user plane function (UPF) that incoming packets have not been detected for the period of time, determining that the MBS session create request comprised the indication that the MBS session is not to be deactivated in an instance that incoming packets are not detected for the period of time and maintaining the MBS as active notwithstanding the report from the MB-UPF that incoming packets have not been detected for the period of time. In an example embodiment, the MBS session create request further comprises an indication of an initial MBS session state with the initial MBS session state being activated or deactivated.

The method of an example embodiment also includes receiving a second multicast and broadcast service (MBS) session create request that comprises a description for a second MBS session. The second MBS session create request does not comprise an indication that the second MBS session is not to be deactivated in the event that incoming packets for the second MBS session are not detected for the period of time. The method of this embodiment also includes configuring, based on an absence of the indication that the second MBS session is not to be deactivated, the multicast and broadcast (MB)-user plane function (UPF) to support the second MBS session and to report that incoming packets for the second MBS session are not detected for the period of time, and taking action to deactivate the second MBS session after receiving a report from the MB-UPF that incoming packets for the second MBS session are not detected for the period of time.

In another example embodiment, an apparatus is provided that includes at least one processor and at least one memory storing instructions that, when executed by the at least one processor cause the apparatus at least to receive a multicast and broadcast service (MBS) session create request that comprises a description for an MBS session, wherein the MBS session create request comprises an indication that the MBS session is not to be deactivated in the event that incoming packets are not detected for a period of time. Based on the indication that the MBS session is not to be deactivated, the apparatus is also caused to ensure that the MBS session remains active in an instance that incoming packets are not detected for the period of time.

The apparatus of an example embodiment is caused to ensure that the MBS remains active by configuring a multicast and broadcast (MB)-user plane function (UPF) to support the MBS session without reporting that incoming packets are not detected for the period of time. In an example embodiment, the apparatus is caused to ensure that the MBS remains active by receiving a report from a multicast and broadcast (MB)-user plane function (UPF) that incoming packets have not been detected for the period of time, determining that the MBS session create request comprised the indication that the MBS session is not to be deactivated in an instance that incoming packets are not detected for the period of time and maintaining the MBS as active notwithstanding the report from the MB-UPF that incoming packets have not been detected for the period of time. In an example embodiment, the MBS session create request further comprises an indication of an initial MBS session state with the initial MBS session state being activated or deactivated.

The apparatus of an example embodiment is further caused to receive a second multicast and broadcast service (MBS) session create request that comprises a description for a second MBS session. The second MBS session create request does not comprise an indication that the second MBS session is not to be deactivated in the event that incoming packets for the second MBS session are not detected for the period of time. The apparatus of this example embodiment is caused, based on an absence of the indication that the second MBS session is not to be deactivated, to configure the multicast and broadcast (MB)-user plane function (UPF) to support the second MBS session and to report that incoming packets for the second MBS session are not detected for the period of time, and to take action to deactivate the second MBS session after receiving a report from the MB-UPF that incoming packets for the second MBS session are not detected for the period of time.

In a further example embodiment, a computer program product is provided that comprises at least one non-transitory computer readable storage medium having instructions stored therein with the instructions configured, upon execution, to receive a multicast and broadcast service (MBS) session create request that comprises a description for an MBS session. The MBS session create request comprises an indication that the MBS session is not to be deactivated in the event that incoming packets are not detected for a period of time. The instructions are also configured to, based on the indication that the MBS session is not to be deactivated, ensure that the MBS session remains active in an instance that incoming packets are not detected for the period of time.

The instructions of an example embodiment that are configured to ensure that the MBS remains active comprise instructions configured to configure a multicast and broadcast (MB)-user plane function (UPF) to support the MBS session without reporting that incoming packets are not detected for the period of time. In an example embodiment, the instructions configured to ensure that the MBS remains active comprise instructions configured to receive a report from a multicast and broadcast (MB)-user plane function (UPF) that incoming packets have not been detected for the period of time, determine that the MBS session create request comprised the indication that the MBS session is not to be deactivated in an instance that incoming packets are not detected for the period of time and maintain the MBS as active notwithstanding the report from the MB-UPF that incoming packets have not been detected for the period of time. In an example embodiment, the MBS session create request further comprises an indication of an initial MBS session state with the initial MBS session state being activated or deactivated.

The computer program product of an example embodiment further comprise instructions configured to receive a second multicast and broadcast service (MBS) session create request that comprises a description for a second MBS session. The second MBS session create request does not comprise an indication that the second MBS session is not to be deactivated in the event that incoming packets for the second MBS session are not detected for the period of time. The apparatus is also caused to, based on an absence of the indication that the second MBS session is not to be deactivated, configure the multicast and broadcast (MB)-user plane function (UPF) to support the second MBS session and to report that incoming packets for the second MBS session are not detected for the period of time, and to take action to deactivate the second MBS session after receiving a report from the MB-UPF that incoming packets for the second MBS session are not detected for the period of time.

In yet another example embodiment, an apparatus is provided that comprises means for receiving a multicast and broadcast service (MBS) session create request that comprises a description for an MBS session. The MBS session create request comprises an indication that the MBS session is not to be deactivated in the event that incoming packets are not detected for a period of time. The apparatus also includes means for ensuring that, based on the indication that the MBS session is not to be deactivated, the MBS session remains active in an instance that incoming packets are not detected for the period of time.

The means for ensuring that the MBS remains active in accordance with an example embodiment comprises means for configuring a multicast and broadcast (MB)-user plane function (UPF) to support the MBS session without reporting that incoming packets are not detected for the period of time. In an example embodiment, the means for ensuring that the MBS remains active comprises means for receiving a report from a multicast and broadcast (MB)-user plane function (UPF) that incoming packets have not been detected for the period of time; means for determining that the MBS session create request comprised the indication that the MBS session is not to be deactivated in an instance that incoming packets are not detected for the period of time and means for maintaining the MBS as active notwithstanding the report from the MB-UPF that incoming packets have not been detected for the period of time. In an example embodiment, the MBS session create request further comprises an indication of an initial MBS session state with the initial MBS session state being activated or deactivated.

The apparatus of an example embodiment further comprises means for receiving a second multicast and broadcast service (MBS) session create request that comprises a description for a second MBS session. The second MBS session create request does not comprise an indication that the second MBS session is not to be deactivated in the event that incoming packets for the second MBS session are not detected for the period of time. The apparatus also includes means for configuring, based on an absence of the indication that the second MBS session is not to be deactivated, that the multicast and broadcast (MB)-user plane function (UPF) to support the second MBS session and to report that incoming packets for the second MBS session are not detected for the period of time, and means for taking action to deactivate the second MBS session after receiving a report from the MB-UPF that incoming packets for the second MBS session are not detected for the period of time.

The means for ensuring that the MBS remains active in an example embodiment includes means for configuring a multicast and broadcast (MB)-user plane function (UPF) to support the MBS session without reporting that incoming packets are not detected for the period of time. The means for ensuring that the MBS remains active includes means for receiving a report from a multicast and broadcast (MB)-user plane function (UPF) that incoming packets have not been detected for the period of time, means for determining that the MBS session create request comprised the indication that the MBS session is not to be deactivated in an instance that incoming packets are not detected for the period of time and means for maintaining the MBS as active notwithstanding the report from the MB-UPF that incoming packets have not been detected for the period of time. In an example embodiment, the MBS session create request further comprises an indication of an initial MBS session state with the initial MBS session state being activated or deactivated.

The apparatus of an example embodiment also includes means for receiving a second multicast and broadcast service (MBS) session create request that comprises a description for a second MBS session. The second MBS session create request does not comprise an indication that the second MBS session is not to be deactivated in the event that incoming packets for the second MBS session are not detected for the period of time. The apparatus of this embodiment also includes means for configuring based on an absence of the indication that the second MBS session is not to be deactivated, that the multicast and broadcast (MB)-user plane function (UPF) to support the second MBS session and to report that incoming packets for the second MBS session are not detected for the period of time, and means for taking action to deactivate the second MBS session after receiving a report from the MB-UPF that incoming packets for the second MBS session are not detected for the period of time.

BRIEF DESCRIPTION OF THE DRAWINGS

Figure 1:
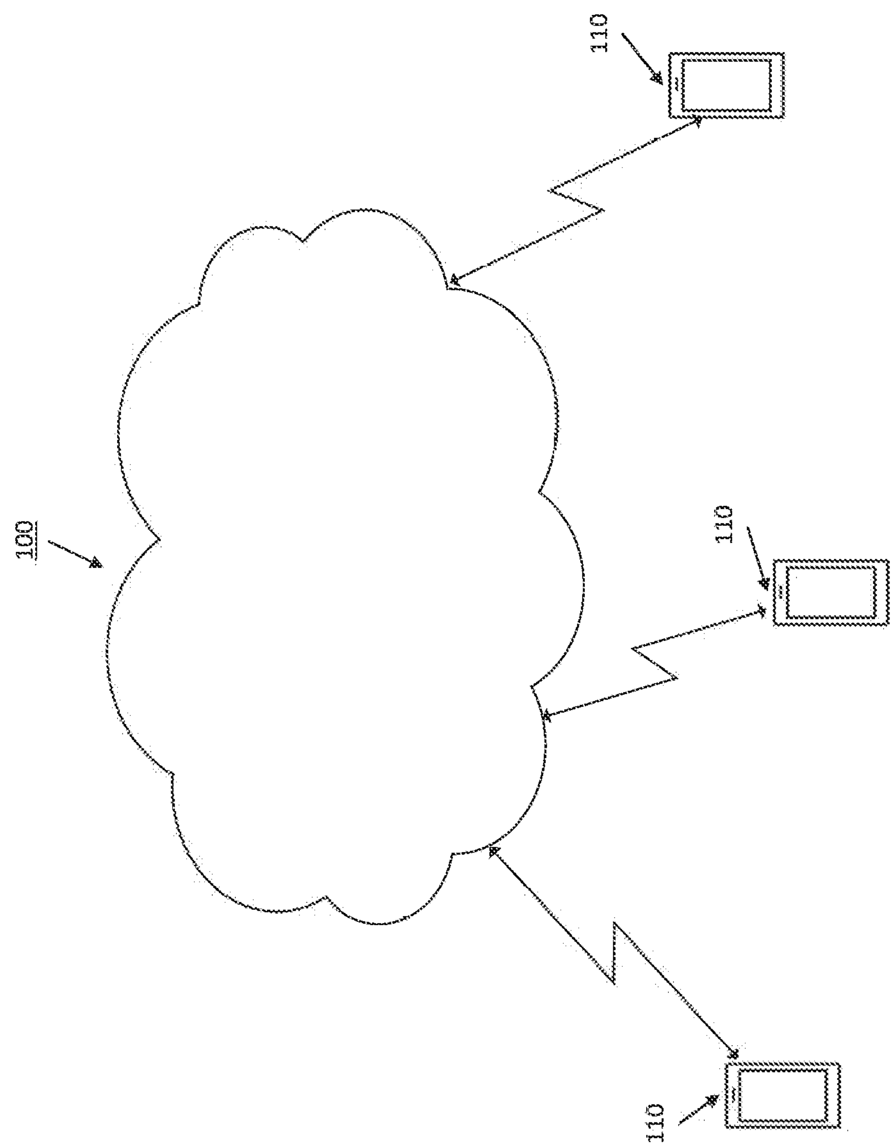
Figure 2:
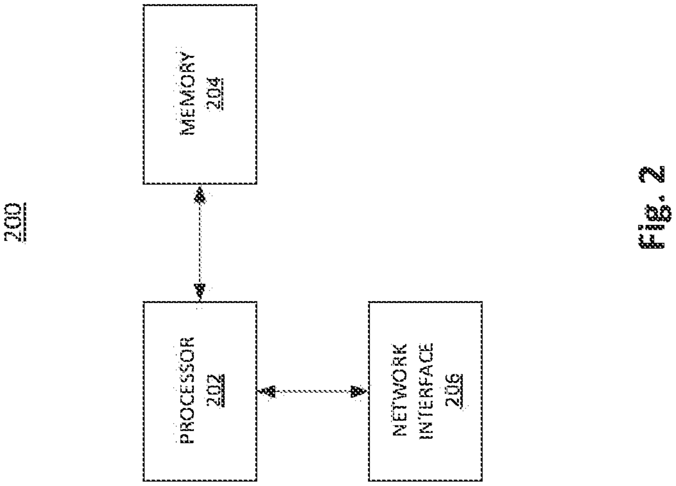
Figure 3A:
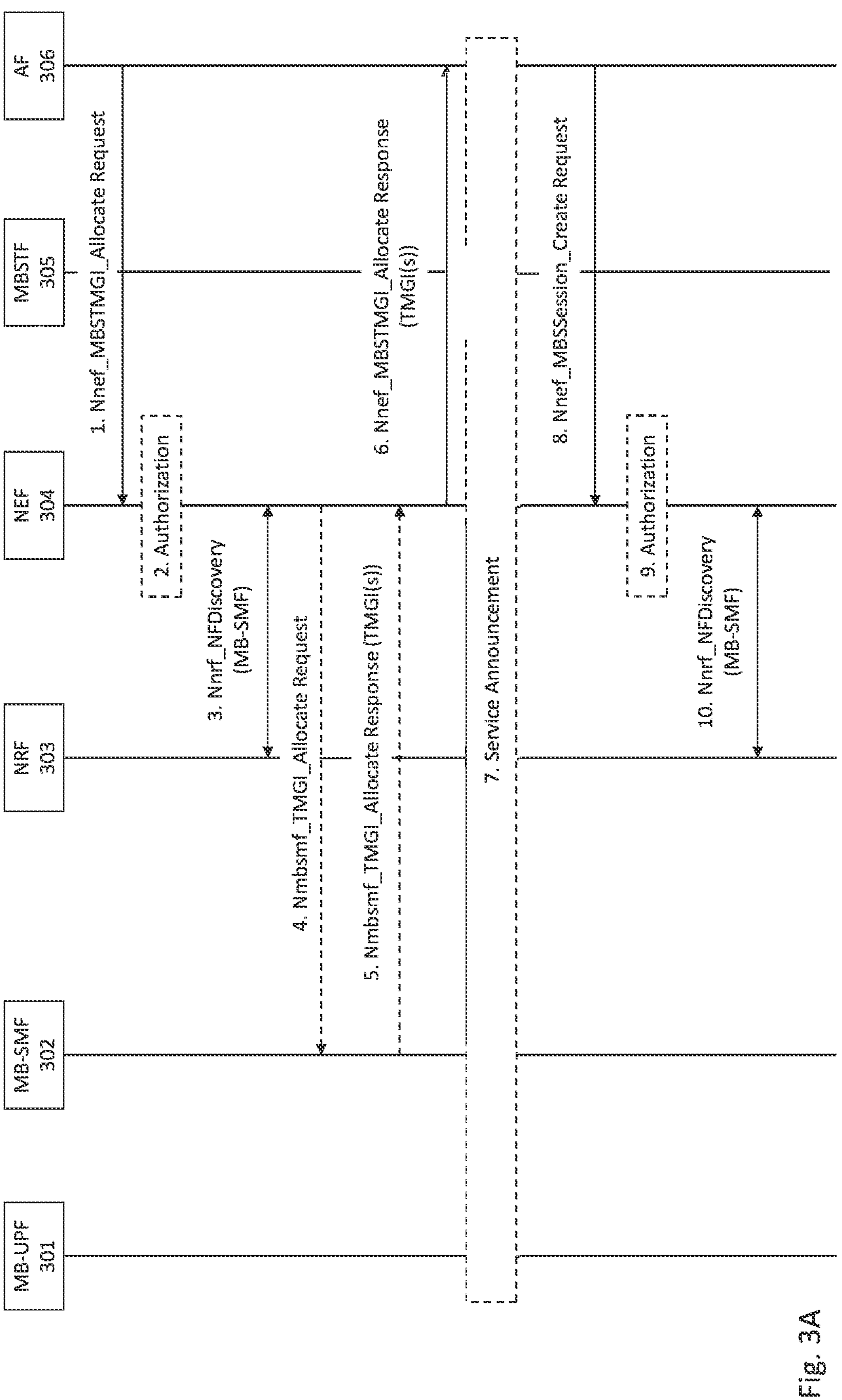
Figure 3B:
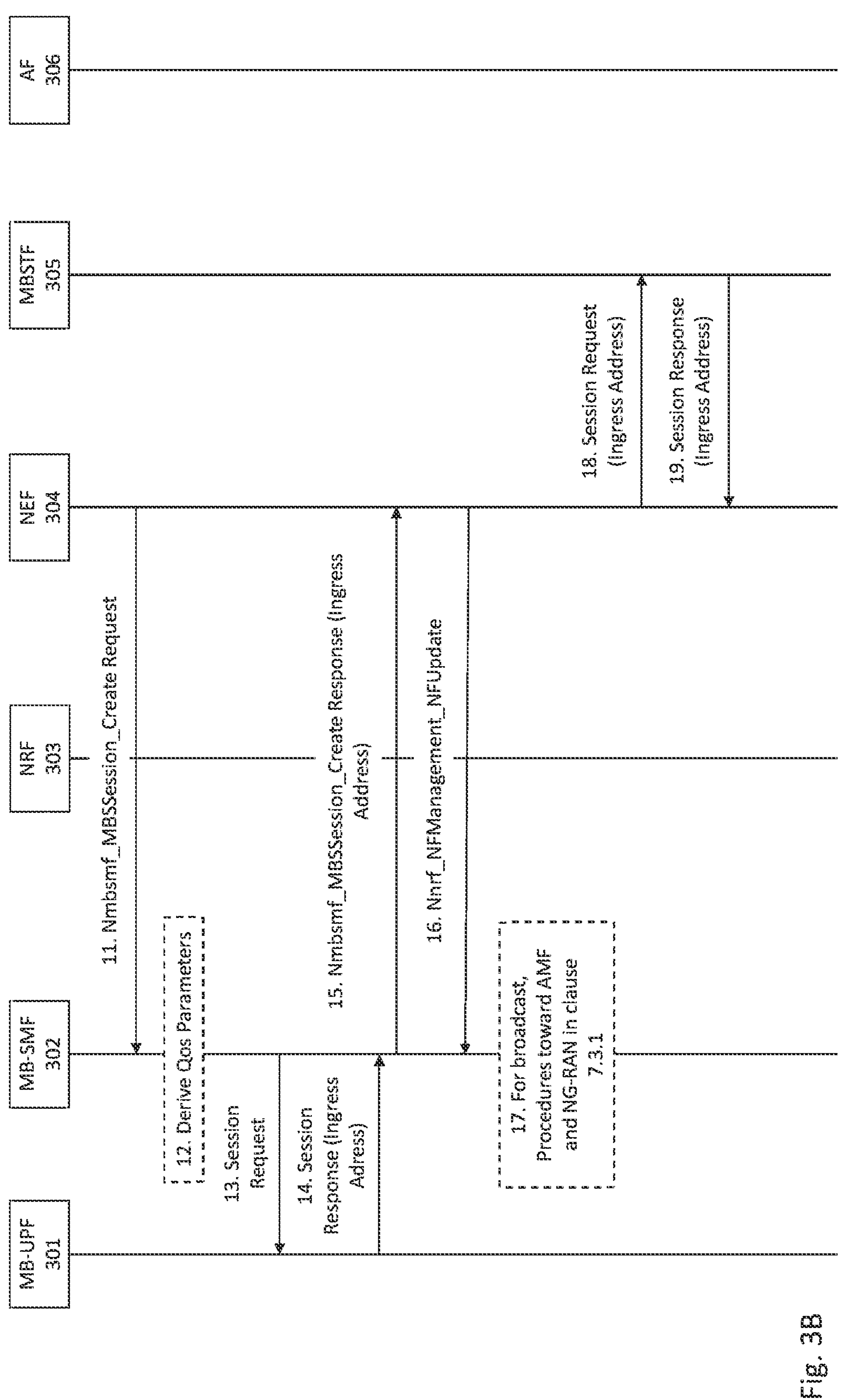
Figure 3C:
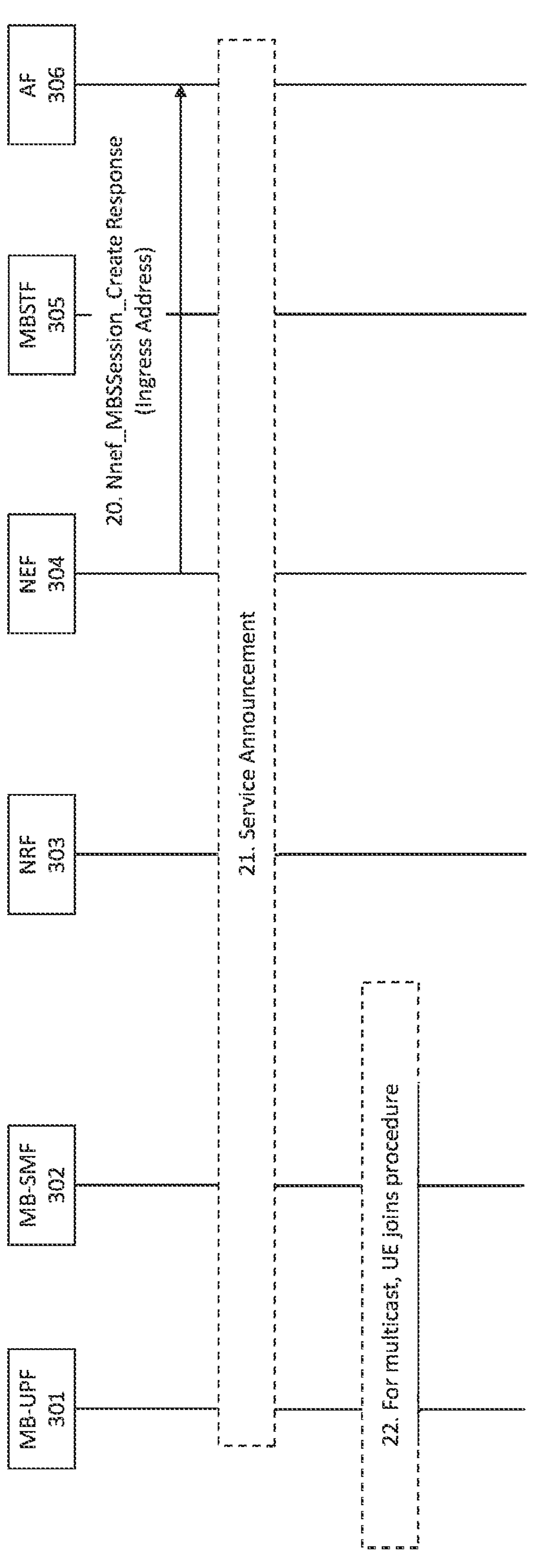
Figure 4:
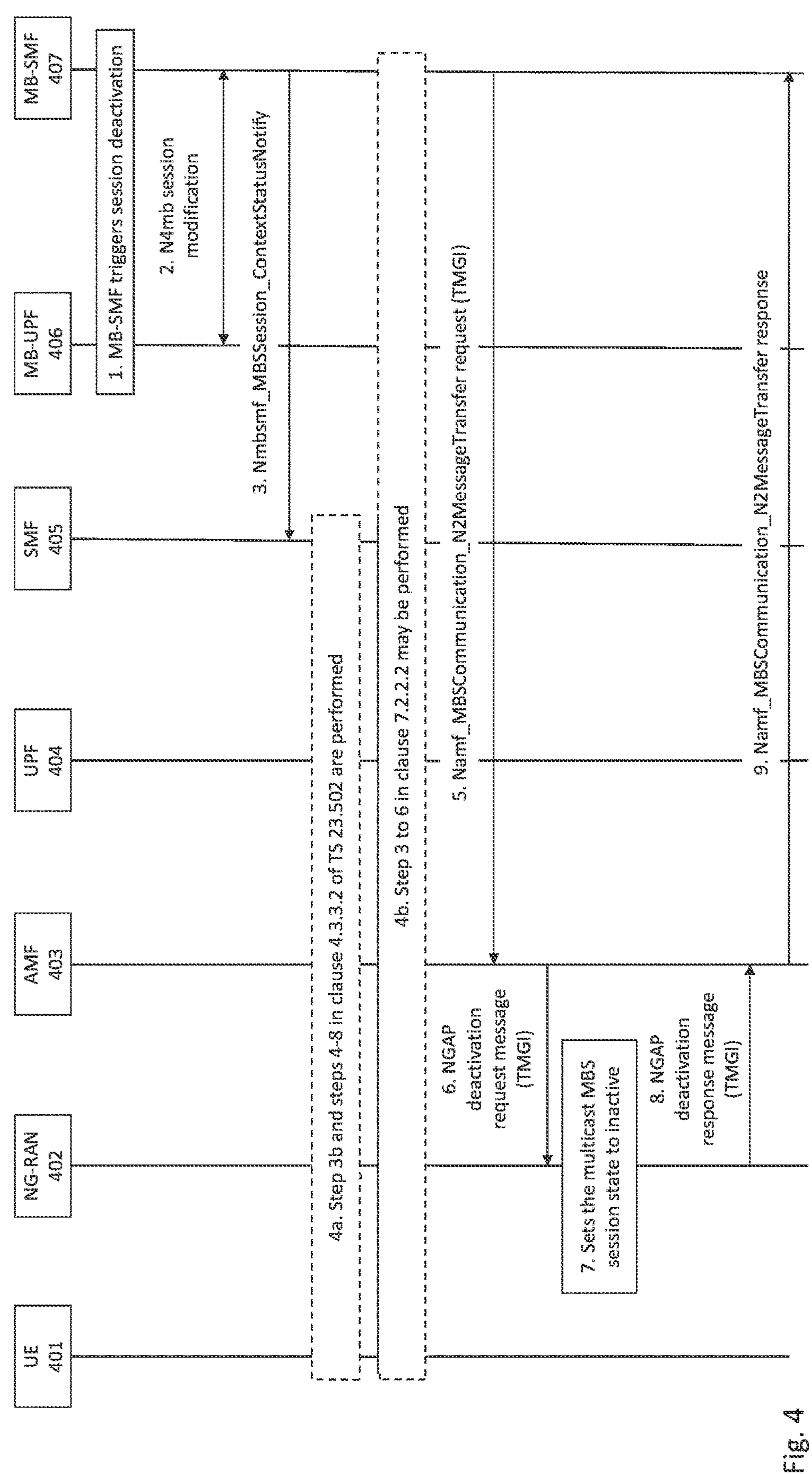
Figure 5:
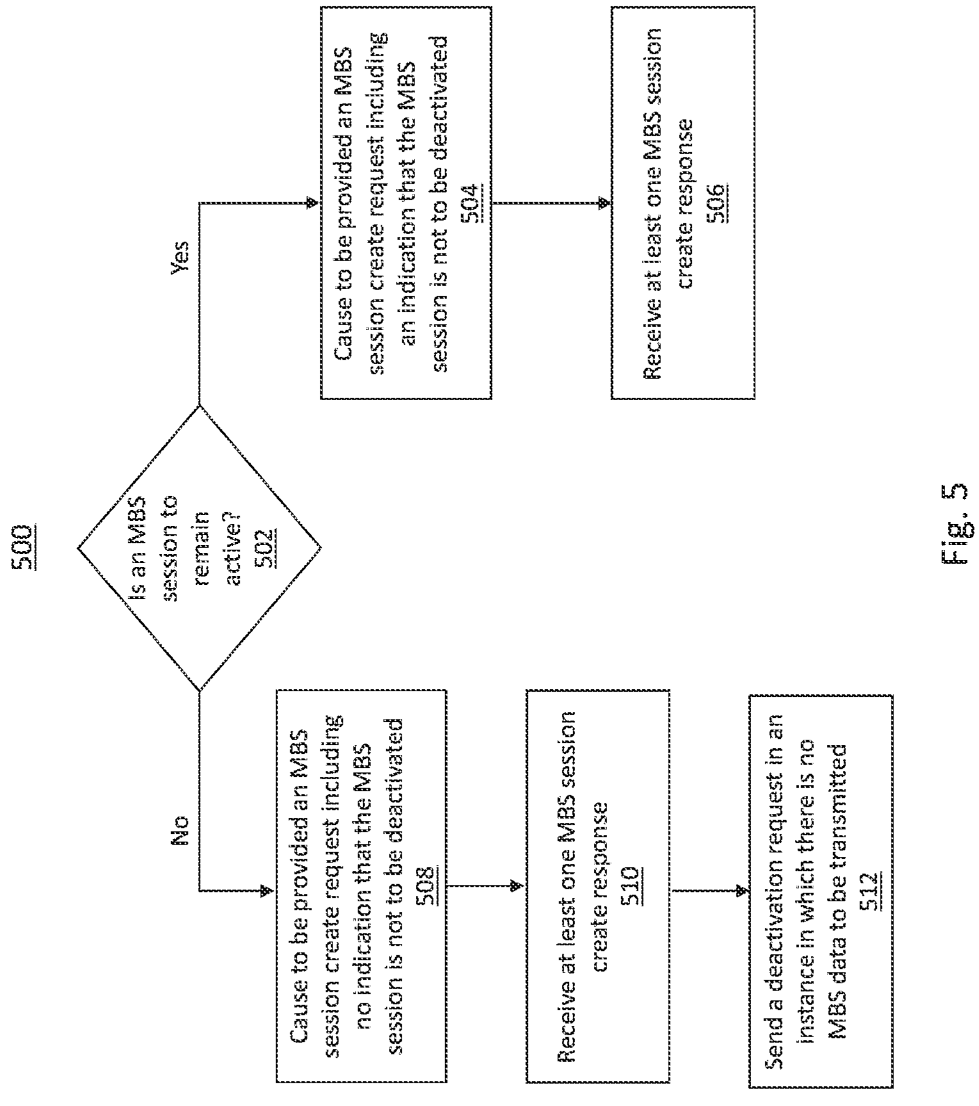
Figure 6:
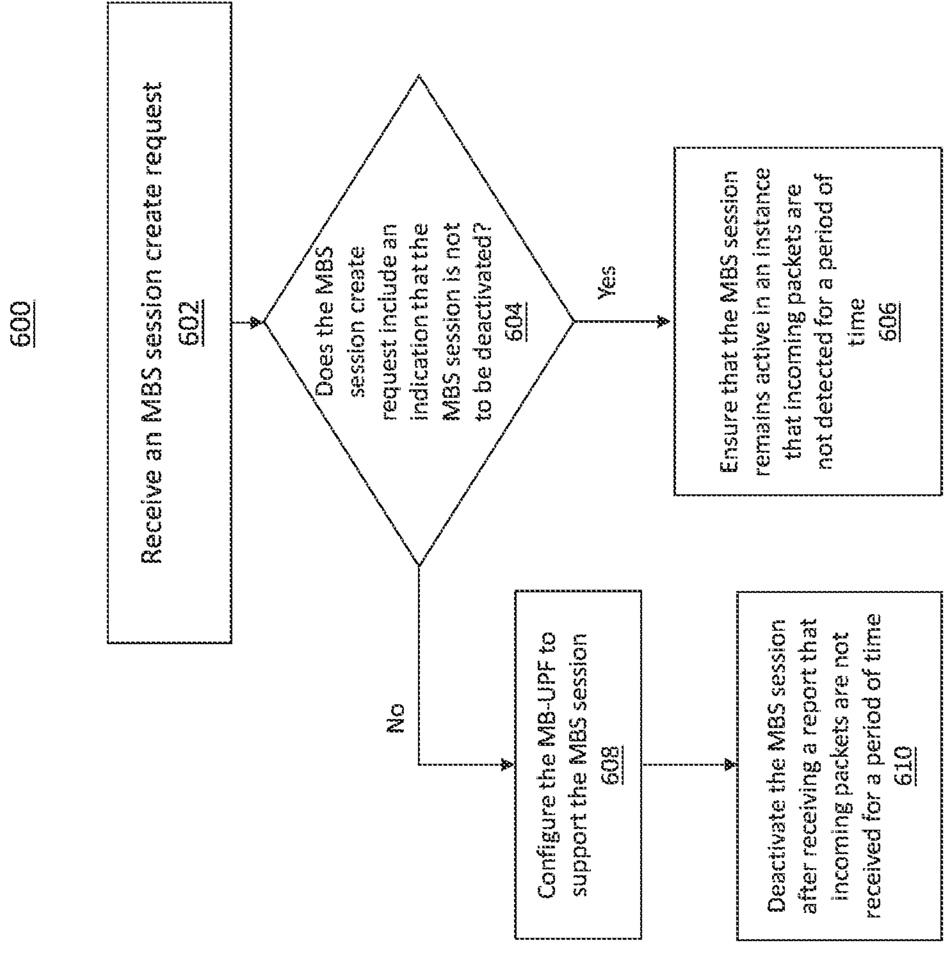
Figure 7:
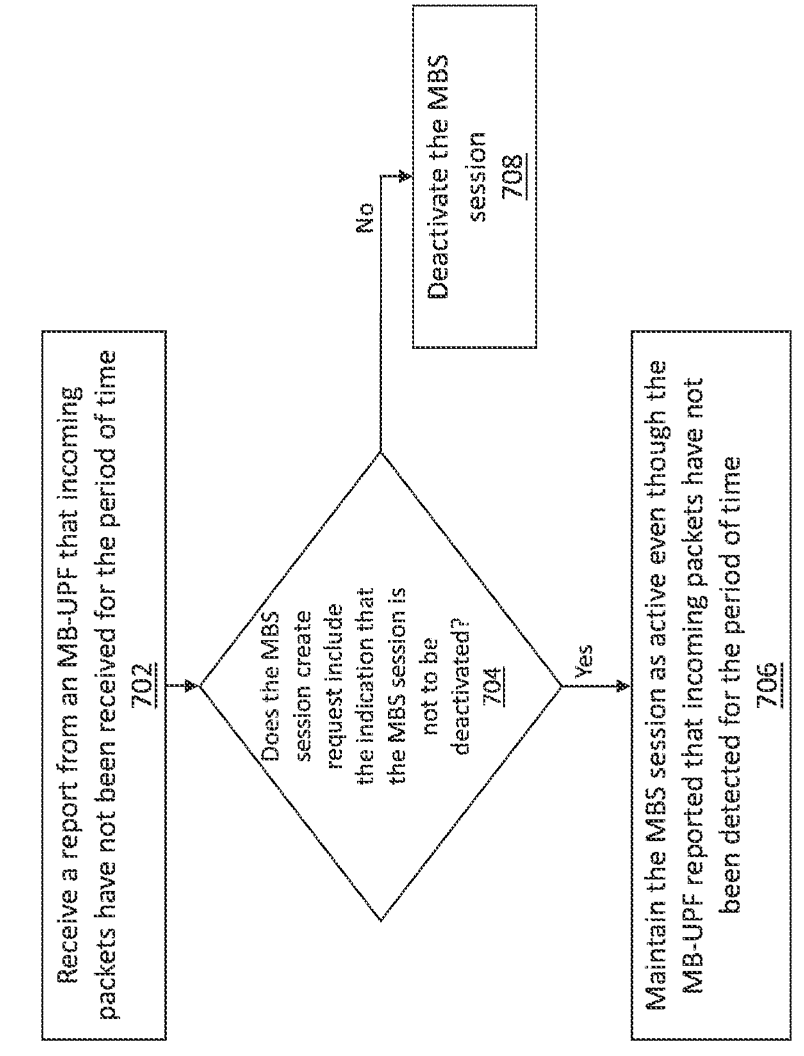

Having thus described certain example embodiments of the present disclosure in general terms, reference will hereinafter be made to the accompanying drawings, which are not necessarily drawn to scale, and wherein:

FIG. 1 illustrates an example of a communication system in which an example embodiment of the present disclosure may be implemented;

FIG. 2 illustrates a block diagram of an apparatus that may be configured in accordance with an example embodiment of the present disclosure;

FIGS. 3A-3C illustrate a signal diagram in accordance with an example embodiment of the present disclosure;

FIG. 4 illustrates a signal diagram in accordance with an example embodiment of the present disclosure;

FIG. 5 illustrates an example workflow implemented by an application function in accordance with an example embodiment of the present disclosure; and FIG. 6 illustrates an example workflow implemented by a multicast and broadcast session management function in accordance with an example embodiment of the present disclosure; and FIG. 7 illustrates an example workflow implemented by a multicast and broadcast session management function to ensure that an MBS session remains active in accordance with an example embodiment of the present disclosure.

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with the described embodiments. Thus, use of any such terms should not be taken to limit the spirit and scope of the embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of. Furthermore, to the extent that the terms "includes" and "including," and variants thereof are used in either the detailed description or the claims, these terms are intended to be inclusive in a manner similar to the term "comprising."

The phrases "in one embodiment," "according to one embodiment," "in some embodiments," "in various embodiments", and the like generally refer to the fact that the particular feature, structure, or characteristic following the phrase may be included in at least one embodiment of the present disclosure, but not necessarily all embodiments of the present disclosure. Thus, the particular feature, structure, or characteristic may be included in more than one embodiment of the present disclosure such that these phrases do not necessarily refer to the same embodiment.

As used herein, the terms "example," "exemplary," and the like are used to mean "serving as an example, instance, or illustration." Any implementation, aspect, or design described herein as "example" or "exemplary" is not necessarily to be construed as preferred or advantageous over other implementations, aspects, or designs. Rather, use of the terms "example," "exemplary," and the like are intended to present concepts in a concrete fashion.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

As used herein, the term "computer-readable medium" refers to signal, non-transitory computer-readable medium and the like. The term 'non-transitory computer-readable medium' refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Examples of non-transitory computer-readable media may include, but are not limited to, one or more types of hardware memory, non-transitory tangible media (for example, one or more magnetic storage disks, one or more optical disks, one or more USB flash drives), computer system memory or random-access memory (such as, DRAM, SRAM, EDO RAM), and the like.

As illustrated in FIG. 1, a communication network 100 is provided in accordance with various embodiments of the present disclosure. In some embodiments, the communication network 100 is in communication with a plurality of user equipment (UE) 110. By way of example, the network 100 may be deployed within a radio access architecture based on long term evolution advanced (LTE Advanced, LTE-A) and/or new radio (NR, 5G). However, the system may be deployed in other network architectures including within other communication networks including, for example, other communication networks developed in the future, e.g., sixth generation (6G) networks, as well as any of a number of existing networks including a universal mobile telecommunications system (UMTS) radio access network (UTRAN, E-UTRAN or NG-RAN), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

The UE 110 may be any type of user terminal, terminal device, etc. to which resources on the air interface are allocated and assigned. For example, the UE may be a portable computing device such as a wireless mobile communication device including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. The user equipment may also be called a subscriber unit, mobile station, remote terminal, access terminal, user terminal or user equipment (UE) just to mention but a few names or apparatuses.

The network 100 may include a plurality of network devices, such as a variety of network functions configured to perform respective functions for the network or a network slice. By way of example, the network may include at least one application function that is configured to support a respective network application, at least one multicast and broadcast session management function (MB-SMF), and/or at least one multicast and broadcast user plane function (MB-UPF).

Referring now to FIG. 2, an example apparatus 200 is provided. The apparatus 200 may be an embodiment of a network device or may be embodied by or otherwise associated with a network device. For example, the apparatus may be embodied by or otherwise associated with the application function (AF), the multicast and broadcast session management function (MB-SMF), and/or the multicast and broadcast user plane function (MB-UPF).

Regardless of the device that embodies the apparatus 200, the apparatus may include processor 202, memory 204, and network interface 206. The apparatus 200 may be configured to execute the operations described herein. Although these components are described with respect to the performance of various functions, it should be understood that the particular implementations necessarily include the use of particular hardware. It should also be understood that certain of these components may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a non-transitory computer-readable storage medium). The memory 204 may be configured to store information, data, content, applications, instructions, or the like for enabling the apparatus to carry out various functions in accordance with an example embodiment disclosed herein.

The processor 202 may be embodied in a number of different ways and may, for example, include one or more processing devices configured to perform independently. In some non-limiting embodiments, the processor 202 may include one or more processors configured in tandem via a bus to enable independent execution of instructions, pipelining, and/or multithreading. The use of the term "processor" may be understood to include a single core processor, a multi-core processor, multiple processors internal to the apparatus, and/or remote or "cloud" processors.

In some embodiments, the processor 202 may be configured to execute instructions stored in the memory 204 and/or circuitry otherwise accessible to the processor 202. In some embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment disclosed herein while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may optionally include input/output circuitry that may, in turn, be in communication with processor 202 to provide output to a user and/or other entity and, in some embodiments, to receive an indication of an input. The input/output circuitry may comprise a user interface and may include a display, and may comprise a web user interface, a mobile application, a query-initiating computing device, a kiosk, or the like. In some embodiments, the input/output circuitry may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The network interface 206 may be any means such as a device or circuitry embodied in either hardware or a combination of hardware and software that is configured to receive and/or transmit data from/to a network and/or any other device, circuitry, or module in communication with the apparatus 200. In this regard, the network interface 206 may include, for example, a network interface for enabling communications with a wired or wireless communication network, such as the application function (AF), multicast and broadcast service function (MBSF), multicast and broadcast user plane function (MB-UPF), and/or multicast and broadcast session management function (MB-SMF). For example, the network interface 206 may include one or more network interface cards, antennae, buses, switches, routers, modems, and supporting hardware and/or software, or any other device suitable for enabling communications via a network. Additionally, or alternatively, the network interface 206 may include the circuitry for interacting with the antenna/antennae to cause transmission of signals via the antenna/antennae or to handle receipt of signals received via the antenna/antennae.

FIGS. 3A-3C illustrate an example implementation of a signal flow in accordance with various embodiments of the present disclosure, in which an application function (AF) and/or at least one network exposure function (NEF) or multicast and broadcast service function (MBSF), may be configured to communicate with each other and/or with one or more multicast and broadcast service transport function (MBSTF), one or more multicast and broadcast session management function (MB-SMF), one or more multicast and broadcast user plane function (MB-UPF), and/or one or more network repository function (NRF) to support a MBS session with a plurality of user equipment and to prevent premature deactivation of the MBS session to avoid packet loss. As described below, the AF may indicate that deactivation of the MBS session is to be prevented in certain circumstances, thereby avoiding the issues otherwise associated with the reactivation of a deactivated MBS session including failure of the user equipment to properly receive the initial packets or complications arising from buffering of the initial packets.

In this regard, after the status of an MBS switches from an active status to a deactivated status, the user equipment that had participated in the MBS session may transition to an idle state. Thereafter, the MBS session may again be activated in order to transmit packets to the user equipment. As the user equipment has transitioned to an idle state, however, the user equipment must first be paged in order to request the user equipment to send a service request to the network to enable the user equipment to again receive packets via the MBS session.

This process not only consumes network resources with the attendant signaling, but also takes some time before the user equipment is again enabled to participate in the MBS session. As such, the initial packets to be transmitted following re-activation of the MBS session may not be received by the user equipment since the user equipment is in the process of again being enabled to participate in the MBS session. While the packets may be buffered pending reactivation of the MBS session, the buffering increases the latency associated with transmission of the packets which may be disfavored for certain applications, such as public safety application. Additionally, the length of time for which the packets would need to be buffered may also be unknown, adding to the complexities associated with efforts to buffer the packets during reactivation of an MBS session. As such, the AF of an example embodiment may be configured to indicate that deactivation of the MBS session is to be prevented in an instance in which packets are not received for at least a predefined period of time so as to avoid these issues including failure of the user equipment to properly receive the initial packets or complications arising from buffering of the initial packets.

With reference to FIG. 3A, operations 1-6 may be optionally performed. In various embodiments, operations 1-6 may be applicable if a temporary mobile group identity (TMGI) is being used as a multicast and broadcast service (MBS) session identifier and is required to be pre-allocated. In this scenario, at operation 1, the apparatus 200 associated with the application function (AF) 306 may include means, such as the processor 202, the memory 204, the network interface 206, or the like, configured to transmit a request, such as an Nnef_MBSTMGI_Allocate Request, to at least one network exposure function (NEF) to request an allocation of a TMGI to identify one or more new MBS session(s). In this embodiment, a MB-SMF 302 may receive the request, such as the Nnef_MBSTMGI_Allocate Request, directly from the AF 306 or from an intermediary device, such as the NEF 304 or from a multicast-broadcast service transport function (BSTF) 305 depending on the network deployment and/or use case. As shown in operation 2, in an instance in which the NEF 304 receives the request, such as the Nnef_MBSTMGI_Allocate Request, the NEF 304 may check the authorization of the AF 306. In various embodiments, the NEF 304 may perform the translation if the AF 306 provides geographical area information and/or civic address information as the MBS service area. In other embodiments, the NEF 304 may not be required to check the authorization of the AF 306, such as in an instance in which the AF 306 is located within a trusted domain.

As shown in operation 3, the apparatus 200 associated with the NEF or MBSF 304 may include means, such as the processor 202, the memory 204, the network interface 206, or the like, configured communication with a network repository function (NRF) 303, such as via Nnrf_NFDiscovery (MB-SMF) signals, to discover and/or select at least on multicast and broadcast session management function (MS-SMF). The NEF or MBSF 304 may be further configured to discover and/or select at least one MB-SMF based at least in part on the local configuration (e.g., MBS service area). As shown in operation 4, the NEF or MBSF 304 may transmit at least one request, such as an Nmbsmf_TMGI_Allocate Request,1 to the at least one MB-SMF 302 to solicit allocation of one or more TMGI(s). As shown in operation 5, the MB-SMF 302 may transmit a response, such as at least one Nmbsmf_TMGI_Allocate Response, to the NEF or MBSF 304 that includes information regarding the allocation of one or more TMGI(s) and/or an expiration time. As shown in operation 6, the NEF or MBSF 304 of this example embodiment responds to the AF 306 with a response, such as an Nnef_MBSTMGI_Allocate Response, that includes the TMGI allocation information from the MB-SMF 302.

As shown in operation 7, the apparatus 200 of an example embodiment that is associated with the AF 306 may include means, such as the processor 202, the memory 204, the network interface 206, or the like, configured to transmit at least one service announcement signal to at least one user equipment (UE). The service announcement signal may comprise information regarding MBS session ID (e.g., TMGI, source specific multicast (SSM), and/or the like), MBS service area, session description information, etc. In various embodiments, the MBS service area information may comprise at least one of the following: Cell ID list, tracking area identity (TAI) list, geographical area information, civic address, etc. The Cell ID list and/or the TAI list may be used in an instance in which the AF 306 resides within a trusted domain, and/or when the AF 306 is aware of the list information. As shown in operation 8, the AF 306 of an example embodiment includes means, such as the processor 202, the memory 204, the network interface 206, or the like, configured to transmit an MBS session create request, such as an Nnef_MBSSession_Create Request, to the NEF 304. The Nnef_MBSSession_Create Request signal may provide a description of an MBS session to be created. The information may comprise information regarding a previously allocated TMGI, MBS service type, MBS service information, TMGI allocation requests, MBS service area, UE indications, start and end time of MBS session, MBS session state, etc. to facilitate creation of an MBS session In an instance in which operations 1-6 have not been performed, the AF 306 may also provide the NEF 304 with an MBS Session ID containing SSM or may request that at least one MBS Session ID is allocated, such as by the MB-SMF. The AF 306 may further provide information regarding the MBS service type (e.g., multicast service or broadcast service) and/or MBS Service Information.

In an instance in which the session is a multicast service type, the AF 306 determines whether the MBS session is not to be deactivated. In an example embodiment, the AF uses at least one of the following criteria for the determination: preconfigured information on whether the MBS session is to remain active, whether data of the MBS session needs to be transmitted with low latency, e.g., less than a predefined threshold, such as 20 msec, whether data of the MBS session requires a low packet loss (e.g. no more than a predetermined percentage of packets, such as no more than each 1000st packet and/or no more than 1 packet in consecution) or no packet loss, whether the MBS session is expected to have only short periods (e.g. periods of a maximum duration of a predefined length of time, such as 10 minutes, for each period) where no data is transmitted, or whether the MBS session relates to public safety. If the AF 306 determines that the MBS session is not to be deactivated, the AF 306 may indicate as part of the description of an MBS session to be created that the initial MBS session state remains "active" and/or may request that the MBS session that is created is not to be deactivated in an instance in which the network fails to detect incoming packets for at least a predetermined period of time. By remaining active and not being deactivated in an instance in which incoming packets are not detected for at least the predetermined period of time, packets may be subsequently transmitted to and received by user equipment pursuant to the MBS session without the risk of the user equipment missing packets while being reactivated and without being required to buffer the packets. In an instance in which the session is a broadcast service type, the AF 306 may determine the MBS frequency selection area (FSA) ID for the broadcast MBS session based at least in part on one or more business agreements.

As shown in operation 9, the apparatus 200 associated with the NEF or MBSF 304 may include means, such as the processor 202, the memory 204, or the like, configured to check the authorization of the AF 306. As shown in operation 10 and assuming that the AF 306 is determined to be authorized, the NEF or MBSF 304 is configured to discover and/or select at least one MB-SMF 302 as an ingress control node. The at least one MB-SMF may be discovered and/or selected based on the MBS service area. In some embodiments in which the AF 306 provides the NEF 304 with at least one TMGI, the NEF or MBSF 304 may use the TMGI information for discovering and/or selecting the MB-SMF 302.

With reference to FIG. 3B, as shown in operation 11, the apparatus associated with the NEF or MBSF 304 may include means, such as the processor 202, the memory 204, the network interface 306, or the like, configured to transmit an MBS session create request, such as an Nmbsmf_MBBSession_Create Request, to at least one selected MB-SMF 302. The Nmbsmf_MBBSession_Create Request signal may request information and/or transmit information to the at least one selected MB-SMF 302. The information may include MBS Session ID, TMGI allocation request, MBS service type, MBS service information, TMGI allocation requests, MBS service area, UE indications, start and end time of MBS session, MBS session state, ingress transport address request indication FSA ID(s), multicast session security context, etc. In an instance in which the session is a multicast service type, the information may include as part of the description of an MBS session to be created a request that the MBS session that is created is not to be deactivated in an instance in which the network fails to detect incoming packets for at least a predetermined period of time. The MBS session create request may be further configured to request that the selected MB-SMF 302 reserve at least one ingress resource for an MBS distribution session. As shown in operation 12, the apparatus 200 associated with the selected MB-SMF may include means, such as the processor 202, the memory 204, or the like, configured to derive the required quality of service (QOS) parameters, wherein the QoS parameters may be based on the MBS service information.

As shown in operation 13, the apparatus 200 associated with the selected MB-SMF 302 may include means, such as the processor 202, the memory 204, the network interface 206, or the like, configured to select at least one multicast and broadcast user plane function 301 and transmit at least one session request. In an instance in which the allocation of an ingress transport address was requested in the previous operation, the MB-SMF 302 may also request that the MB-UPF reserves at least one user plane ingress resource. In an instance in which multicast transports the MBS data towards RAN nodes, the MB-SMF 302 may further request the MB-UPF 301 reserves a tunnel endpoint for outgoing data and/or to transmit data received at the user plane ingress resource using the tunnel endpoint. In an instance in which the allocation of an ingress transport address was not requested in the previous operation, the MB-SMF of an example embodiment may be configured to provide the MB-UPF 301 with the SSM as the MBS Session ID. The MB-SMF 302 may further request that the MB-UPF 301 joins a corresponding multicast tree based on information (e.g., session is inactive, service requirements, MBS start and end times, etc.). In one example embodiment, the MB-SMF 302 may request that the MB-UPF 301 notifies the MB-SMF 302 when the MB-UPF 301 does not receive packets for a predetermined amount of time during an MBS session and stores the possibly received request that the MBS session is not to be deactivated in relation to the MBS session. In other embodiments, however, when receiving a request that the MBS session that is created is not to be deactivated, the MB-SMF 302 may not request the MB-UPF 302 to notify the MB-SMF 302 if the MB-UPF 301 does not receive packets for a predetermined amount of time during the MBS session. Conversely, when not receiving a request that the MBS session that is created is not to be deactivated, the MB-SMF 302 may request the MB-UPF 302 to notify the MB-SMF 302 if the MB-UPF 301 does not receive packets for a predetermined amount of time during the MBS session.

As shown in operation 14, the apparatus 200 associated with the MB-UPF 301 may include means, such as the processor 202, the memory 204, network interface, or the like, configured to select an ingress address (e.g., IP address and/or port) and a tunnel endpoint for out going data. The MB-UPF 301 transmits this information to the MB-SMF 302. As shown in operation 15, the apparatus 200 associated with the MB-SMF 302 may include means, such as the processor 202, the memory 204, the network interface 206, or the like, configured to transmit an MBS session create response, such as an Nmbsmf_MBSSession_Create Response, to the NEF 304. The Nmbsmf_MBSSession_Create Response signal provides the NEF 304 with the selected ingress address of the MB-UPF 301. As shown in operation 16, the NEF or MBSF 304 may optionally provide an updated, such as one or more Nnrf_NFMangagement_NFUpdate signals, to the MB-SMF 302. The update may provide updated MBS Session information.

As shown in operation 17, the apparatus 200 associated with the MB-SMF 302 may include means, such as the processor 202, the memory 204, the network interface 206, or the like, configured, in a broadcast communication service, to continue the procedure towards the AMF and/or NG-RAN. As shown in operation 18, in an instance in which the NEF or MBSF 304 uses the MBSTF 305, the NEF 304 provides the MBSTF 305 with the ingress address received from the MB-SMF 302. As shown in operation 19, if the previous operation was completed, the MBSTF 305 selects an ingress address (e.g., IP address and port) and provides the information to the NEF 304.

With reference to FIG. 3, as shown in operation 20, the apparatus 200 associated with the NEF 304 may include means, such as the processor 202, the memory 204, or the like, configured to transmit an MBS session create response, such as an Nnef_MBSSession_Create Response, to the AF 306. As shown in operation 21, the apparatus 200 associated with the AF 306 may include means, such as the processor 202, the memory 204, or the like, configured to optionally transmit one or more additional service announcements, similar to the one described in operation 7. As shown in operation 22, for multicast communications, at least one UE may be configured to join the MBS Session. As such, an MBS session may be created and, as described below, issues associated with premature deactivation of the MBS session may be avoided.

FIG. 4 illustrates an example implementation of a signal flow in accordance with an example embodiment of the present disclosure, in which a MB-SMF 407 may be configured to deactivate an MBS session. As illustrated, the MB-SMF 407 of this example embodiment is in communication with at least one UE 401, at least one NG-RAN 402, at least one AMF 403, at least one UPF 404, at least one SMF 405, and/or at least one MB-UPF 406. The MBS session deactivation procedure may be improved in accordance with various embodiments by avoiding deactivation in certain circumstances, such as in an instance in which a packet has not been received for at least a predetermined period of time.

As shown in operation 1 of FIG. 4, the apparatus 200 associated with the MB-SMF may include means, such as the processor 202, the memory 204, the network interface 206, or the like, configured to decide whether to trigger an MBS session deactivation. The MB-UPF may transmit a notification message indicating that no packets for the MBS session were received for a configured time, to the MB-SMF 407. In some embodiment, if the MB-SMF has stored a request that the MBS session is not to be deactivated, the MB-SMF does not take any further action upon receiving the notification message and does not perform the subsequent operations. If the MB-SMF has not stored a request that the MBS session is to be deactivated, upon receiving the notification message, the MB-SMF may then deactivate the MBS session by performing the subsequent operations. If the MB-SMF 407 decides to deactivate the MBS session, the MB-SMF may send an N4mb Session Modification message as shown in operation 2 to the MB-UPF comprising a request to be informed about the detection of incoming data for the MBS session, to enable the MB-SMF to subsequently activate the MBS session again upon receiving a notification about the detection of incoming data for the MBS session, e.g., packets.

As shown in operation 3, the MB-SMF 407 may transmit an MBS session context notify request, such as an mbsmf_MBSSession_ContextStatusNotify Request signal, to the SMF 405 configuring the SMF 405 to set an indicated multicast MBS session state to inactive. As shown in operation 4A, a UE(s) for which the 5GC individual delivery is used, operation 3*b* and operations 4-8 in clause 4.3.3.2 of 3GPP TS 23.502 may then be performed to remove the associated QoS flow(s) related to the multicast MBS session. As shown in operation 4B, UE(s) for which the 5GC individual delivery is used, the related SMF(s) may keep the shared tunnel that is used for individual MBS traffic delivery, such as over an N19mb interface. In an instance in which the SMF decides to release the shared tunnel, operations 3 to 6 in clause 7.2.2.2 of 3GPP TS 23.247 may be performed. As shown in operation 5, in an instance in which the MB-SMF identifies a shared tunnel established over the N3mb interface, the MB-SMF 407 of this example embodiment transmits a message transfer request, such as an Namf_MBSCommunication_N2MessageTransfer Request (including, e.g., TMGI, N2 SM information (Deactivation, TMGI)), to the AMF(s) 403. As shown in operation 6, the AMF 403 may transmit NGAP deactivation request message to one or more NG-RAN nodes. As shown in operation 8, the one or more NG-RAN node receives and acknowledges the NG application protocol (AP) deactivation response message. As shown in operation 9, the AMF 403 transmits a message transfer response, such as the Namf_MBSCommunication_N2MessageTransfer Response, to the MB-SMF 407 to acknowledge the service.

Referring now to FIGS. 5-7, example flowcharts are provided of the operations performed by an apparatus, such as the apparatus of FIG. 2 embodied by an AF, or an MB-SMF, respectively. Referring now to FIG. 5, an example method 500 is illustrated that can be carried out by an apparatus as embodied by the AF with the apparatus including means, such as the processor 202, the memory 204, the network interface 206, or the like, for determining whether a MBS session is to remain activate such as in an instance in which packets are not received for at least a predetermined period of time. See block 502. In some embodiment the apparatus uses at least one of the following criteria for the determination: preconfigured information on whether the MBS session is to remain active, whether data of the MBS session need to be transmitted with low latency, e.g., less than a predetermined latency, such as less than 20 msec, whether data of the MBS session require a low packet loss (e.g. no more than a predetermined percentage of packets, such as no more than each 1000st packet and/or no more than 1 packet in consecution) or no packet loss, whether the MBS session is expected to have only short periods (e.g. periods of a maximum duration of a predefined length of time, such as 10 minutes, for each period) where no data are transmitted, or whether the MBS session relates to public safety.

The apparatus includes means, such as the processor 202, the memory 204 the network interface 206 or the like, for causing, in an instance in which the MBS session, such as a second MBS session, is not determined to remain active in an instance in which MBS data is not received, an MBS session create request to be provided that includes a description for the MBS session, but that does not include any indication that the MBS session is not to be deactivated in the event that incoming packets are not detected for a period of time. See block 508. Thus, the MBS session create request in this instance is independent of any indication that the MBS session is not to be deactivated in the event that incoming packets are not detected for a period of time. The apparatus of an example embodiment may also include means, such as the processor 202, the memory 204, the network interface 206 or the like, for receiving, following the MBS session create request, at least one MBS session create response, such as from the MB-SMF. See block 510. The apparatus may include means, such as the processor 202, the memory 204, the network interface 206 or the like, for causing, in this instance in which no indication was provided to prevent the MBS session from being deactivated, a deactivation request to be sent, such as to the MB-SMF, in an instance in which packets have not been received for at least a predetermined period of time. See block 512.

The apparatus may also include means, such as the processor 202, the memory 204, the network interface 206 or the like, for causing, in an instance in which the MBS session is to remain active even in the absence of incoming packets, an MBS session create request to be provided that includes a description for the MBS session. See block 504. Since the MBS session is determined to remain active, the MBS session request comprises an indication that the MBS session is not to be deactivated in the event that incoming packets are not detected for a period of time. By avoiding deactivation in accordance with the MBS session request and, instead, permitting the MBS session to remain active even in an instance in which packets are not detected by the MB-UPF for at least a predetermined period of time, the issues otherwise associated with the reactivation of a deactivated MBS session including failure of the user equipment to properly receive the initial packets or complications arising from buffering of the initial packets may be avoided. In some embodiments, the MBS session request may further comprise an indication of an initial MBS session state (e.g., activated or deactivated). In various embodiments, the at least one MBS session create request may further comprise information of at least one of the following: an MBS session identifier, an MBS service type, an MBS service information, an MBS service area, an MBS session state, or MBS session start and end times. In some embodiments, if the determination whether a MBS session is not to be deactivated is positive, the apparatus also does not send subsequent requests to deactivate the MBS session when there are no MBS data to be transmitted; if the determination whether a MBS session is not to be deactivated is negative, the apparatus also sends subsequent requests to deactivate the MBS session when there are no MBS data to be transmitted. The apparatus of an example embodiment may also include means, such as the processor 202, the memory 204, the network interface 206 or the like, for receiving at least one MBS session create response, such as from the MB-SMF, following the MBS session create request. See block 506.

Referring now to FIG. 6, an example flowchart illustrating the operations performed, such as by an apparatus as depicted in FIG. 2 and embodied as the MB-SMF. Referring now to FIG. 6, a method 600 is illustrated that can be carried out by an apparatus embodied by an MB-SMF and that comprises means, such as the processor 202, the memory 204, the network interface 206, or the like for receiving an MBS session create request, such as from the AF, an NEF, or an MBSF, that comprises a description of an MBS session. Sec block 602. The MBS session create request may comprise an indication that the MBS session is not to be deactivated in the event that incoming packets are not detected for a period of time. In various embodiments, the description for an MBS session may comprise at least one of the following: MBS session ID (e.g., TMGI, SSM, and/or the like), MBS service area, session description information, etc.

As shown in block 604, the apparatus of an example embodiment includes means, such as the processor 202, the memory 204 or the like, for determining whether or that the MBS session create request includes an indication that the MBS session is not to be deactivated, such as in an instance in which packets are not received for a least a predetermined period of time. The example apparatus may also include means, such as the processor 202, the memory 204, the network interface 206 or the like, for configuring the MB-UPF to support the MBS session when the MBS session create request is determined not to include an indication that the MBS session is not to be deactivated. See block 608. The example apparatus may also include means, such as the processor 202, the memory 204, the network interface 206 or the like, for deactivating, based on the indication that the MBS session is not to be deactivated, and after receiving a report from the MB-UPF that incoming packets have not been received for at least a predetermined period of time, the MBS session at the MB-UPF. See block 610.

The apparatus may also include means, such as the processor 202, the memory 204, or the like, for ensuring that, in response to determining that the MBS session create request comprises a description for an MBS session and an indication that the MBS session is not to be deactivated, the MBS session remains active in the event that incoming packets are not detected for a period of time. See block 606. The MB-SMF may ensure that the MBS session remains active in any one of several different manners.

In one embodiment, the apparatus embodied by the MB-SMF may be configured to ensure that the MBS remains active by configuring an MB-UPF to support the MB session without configuring the MB-UPF to report that incoming packets are not being detected for at least the predetermined period of time. In this embodiment, even if the MB-UPF does not receive incoming packets for at least the predetermined period of time, the MB-UPF will then not report this issue to the MB-SMF. Thus, the MB-SMF of this embodiment will not learn that incoming packets have not been detected for at least the predetermined period of time and, as such, will not take action, to have the MBS session deactivated. For taking action in response to receiving an MBS session create request that does not comprise an indication that the MBS session is not to be deactivated, the apparatus may include means to configure an MB-UPF to support the MB session and to report that incoming packets are not being detected for at least the predetermined period of time. If the MB-UPF then does not receive incoming packets for at least the predetermined period of time, the MB-UPF will report this issue to the MB-SMF, and the MB-SMF will then take action to have the MBS session deactivated.

In an alternative embodiment, the apparatus that is embodied by the MB-SMF does not configure the MB-UPF to perform any differently, but, instead, the apparatus embodied by the MB-SMF is configured to ignore and take no action with respect to a report from the MB-UPF that incoming packets have not been received for at least the predetermined period of time Thus, even if incoming packets have not been received for at least the predetermined period of time and the MB-UPF has provided a report of this situation, the MB-SMF of this embodiment will not take action, such as to have the MBS session deactivated.

In this example embodiment and as depicted in FIG. 7, the apparatus includes means, such as the processor 202, the memory 204, the network interface 206 or the like, for receiving a report from the MB-UPF that incoming packets have not been received for at least a predetermined period of time. See block 702. The apparatus of this example embodiment also includes means, such as the processor 202, the memory 204 or the like, for determining whether the MBS session create request included the indication that the MBS session is not to be deactivated, such as in response to receiving the report that incoming packets have not been received, such as by the MB-UPF, for at least the predetermined period of time. See block 704. To address an instance in which the MBS session create request is determined not include an indication that the MBS session is not to be deactivated, the apparatus includes means, such as the processor 202, the memory 204, the network interface 206 or the like, for deactivating the MBS session. Sec block 708. To address an instance in which the MBS session create request is determined to have included the indication that the MBS session is not to be deactivated, the apparatus includes means, such as the processor 202, the memory 204, the network interface 206 or the like, for maintaining the MBS session as active even though the MB-UPF reported that incoming packets have not been detected for at least the predetermined period of time. See block 706.

Consequently, the MBS session will remain active and the issues otherwise associated with the reactivation of a deactivated MBS session including failure of the user equipment to properly receive the initial packets or complications arising from buffering of the initial packets may be avoided.

FIGS. 5-7 illustrate flowcharts depicting operations according to an example embodiment of the present disclosure. It will be understood that each block of the flowcharts and combination of blocks in the flowcharts may be implemented by various means, such as hardware, firmware, processor, circuitry, and/or communication devices associated with execution of software including one or more program instructions. For example, one or more of the procedures or operations described above may be embodied by computer program instructions. In this regard, the computer program instructions which embody the procedures or operations described above may be stored by a memory 204 of an apparatus (e.g., AF, MB-SMF) employing a disclosed embodiment and executed by a processor 202. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Many modifications and other embodiments of the present disclosure set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

The invention claimed is:

1. A method comprising:

determining that a multicast and broadcast service (MBS) session is to remain active; and providing an MBS session create request that includes a description for the MBS session, wherein the MBS session create request further comprises an indication that the MBS session is not to be deactivated in the event that incoming packets are not detected for a period of time.

2. The method of claim 1, wherein the MBS session create request further comprises an indication of an initial MBS session state, wherein the initial MBS session state can be activated or deactivated, and wherein the initial MBS session state is activated when determining that the MBS session is to remain active.

3. The method of claim 1, further comprising, determining that a second MBS session is not to remain active, and sending, based on the determining that the second MBS session is not to remain active, a second MBS session create request that includes a description for the second MBS session, wherein the second MBS session create request does not comprise an indication that the second MBS session is not to be deactivated in the event that incoming packets for the second MBS session are not detected for a period of time.

4. The method of claim 3, further comprising, sending, based on the determining that the second MBS session is not to remain active, a deactivation request for the second MBS session in an instance that there is no MBS data to be transmitted in the second MBS session.

5. The method of claim 4, wherein the at least one MBS session create response comprises information regarding at least one allocated ingress address.

6. The method of claim 1, further comprising, receiving, after the providing the MBS session create request, at least one MBS session create response.

7. The method of claim 1 comprising:

receiving the multicast and broadcast service (MBS) session create request that comprises the description for the MBS session; and based on the indication that the MBS session is not to be deactivated, ensuring that the MBS session remains active in an instance that incoming packets are not detected for the period of time.

8. The method of claim 7, wherein the ensuring that the MBS remains active comprises configuring a multicast and broadcast (MB)-user plane function (UPF) to support the MBS session without reporting that incoming packets are not detected for the period of time.

9. The method of claim 7, wherein the ensuring that the MBS remains active comprises:

receiving a report from a multicast and broadcast (MB)-user plane function (UPF) that incoming packets have not been detected for the period of time;

determining that the MBS session create request that was received comprised the indication that the MBS session is not to be deactivated in an instance that incoming packets are not detected for the period of time; and maintaining the MBS as active notwithstanding the report from the MB-UPF that incoming packets have not been detected for the period of time.

10. The method of claim 7, wherein the MBS session create request further comprises an indication of an initial MBS session state, and wherein the initial MBS session state is activated or deactivated.

11. The method of claim 7, further comprising:

receiving a second multicast and broadcast service (MBS) session create request that comprises a description for a second MBS session, wherein the second MBS session create request does not comprise an indication that the second MBS session is not to be deactivated in the event that incoming packets for the second MBS session are not detected for the period of time; and based on an absence of the indication that the second MBS session is not to be deactivated, configuring the multicast and broadcast (MB)-user plane function (UPF) to support the second MBS session and to report that incoming packets for the second MBS session are not detected for the period of time, and taking action to deactivate the second MBS session after receiving a report from the MB-UPF that incoming packets for the second MBS session are not detected for the period of time.

12. An apparatus comprising:

at least one processor; and at least one memory storing instructions that, when executed by the at least one processor cause the apparatus at least to perform:

determining that a multicast and broadcast service (MBS) session is to remain active; and causing to be provided an MBS session create request that includes a description for the MBS session, wherein the MBS session create request further comprises an indication that the MBS session is not to be deactivated in the event that incoming packets are not detected for a period of time.

13. The apparatus of claim 12, wherein the MBS session create request further comprises an indication of an initial MBS session state, wherein the initial MBS session state can be activated or deactivated, and wherein the initial MBS session state is activated when determining that the MBS session is to remain active.

14. The apparatus of claim 12, wherein the apparatus is caused to determine the MBS session is to remain active by using at least one of the following criteria for the determination: preconfigured information on whether the MBS session is to remain active, whether data of the MBS session is to be transmitted with low latency, whether data of the MBS session requires a low or no packet loss, whether the MBS session is expected to have only short periods where no data are transmitted, or whether the MBS session relates to public safety.

15. The apparatus of claim 12, wherein the at least one MBS session create request further comprises information of at least one of the following: an MBS session identifier, an MBS service type, an MBS service information, an MBS service area, an MBS session state, or MBS session start and end times.

16. The apparatus of claim 12, wherein the apparatus is further caused to determine that a second MBS session is not to remain active, and send, based on determining that the second MBS session is not to remain active, a second MBS session create request that includes a description for the second MBS session, wherein the second MBS session create request does not comprise an indication that the second MBS session is not to be deactivated in the event that incoming packets for the second MBS session are not detected for a period of time.

17. The apparatus of claim 16, wherein the apparatus is further caused to send, based on the determining that the second MBS session is not to remain active, a deactivation request for the second MBS session in an instance that there is no MBS data to be transmitted in the second MBS session.

18. The apparatus of claim 12, wherein the apparatus is further caused to receive, after the causing to be provided the MBS session create request, at least one MBS session create response.

19. The apparatus of claim 18, wherein the at least one MBS session create response comprises information regarding at least one allocated ingress address.

20. A non-transitory computer readable storage medium having instructions stored therein, the instructions configured, upon execution by an apparatus, to perform:

determining that a multicast and broadcast service (MBS) session is to remain active; and causing to be provided an MBS session create request that includes a description for the MBS session, wherein the MBS session create request further comprises an indication that the MBS session is not to be deactivated in the event that incoming packets are not detected for a period of time.

* * * * *